Oct. 24, 1950     R. SADWITH     2,527,199
LIQUID RESERVOIR

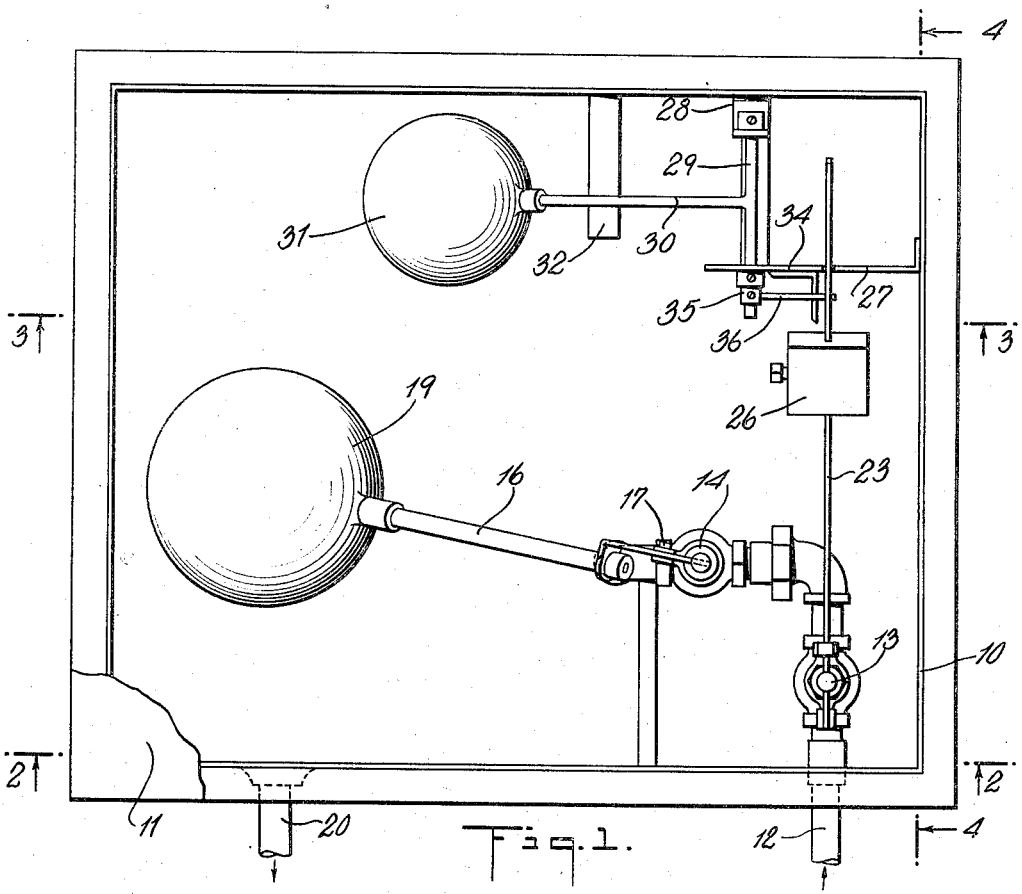
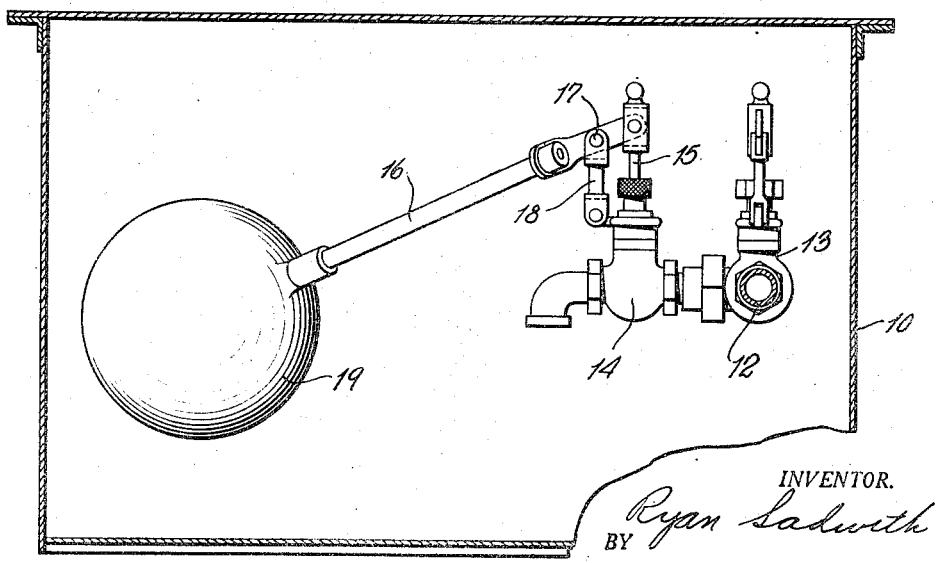

Filed Dec. 23, 1944     2 Sheets-Sheet 2

INVENTOR.
Ryan Sadwith
BY
Kenyon & Kenyon
ATTORNEYS

Patented Oct. 24, 1950

2,527,199

UNITED STATES PATENT OFFICE 2,527,199

LIQUID RESERVOIR

Ryan Sadwith, New Brunswick, N. J., assignor to Ross Industries Corporation, New Brunswick, N. J., a corporation of New Jersey Application December 23, 1944, Serial No. 569,480

2 Claims. (Cl. 137—68)

This invention relates to liquid reservoirs.

An object of this invention is a reservoir to which liquid is supplied and from which liquid is withdrawn and equipped with level-limiting means together with a positive shut-off valve in the inlet which becomes effective upon failure of the level-limiting means.

In an embodiment of the invention, a suitable tank is provided with an inlet and an outlet. The inlet is equipped with two valves, one of which is responsive to the liquid level in the tank to regulate the inflow of liquid to prevent the liquid level rising above a predetermined limit. The other valve is a positive shut-off valve which is normally maintained in open position but which is automatically closed upon rise of the liquid in the tank above a predetermined level. This arrangement effectively prevents flooding of the tank upon failure of the operating mechanism of the first valve and in the event that the second valve moves to closed position, it must be manually returned to open position and again latched in such position.

Other objects, novel features and advantages of this invention will become apparent from the following specification and accompanying drawings, wherein:

Fig. 1 is a plan view with the cover partially broken away of a liquid reservoir embodying the invention;

Fig. 2 is a section on the line 2—2 of Fig. 1;

Figure 3:
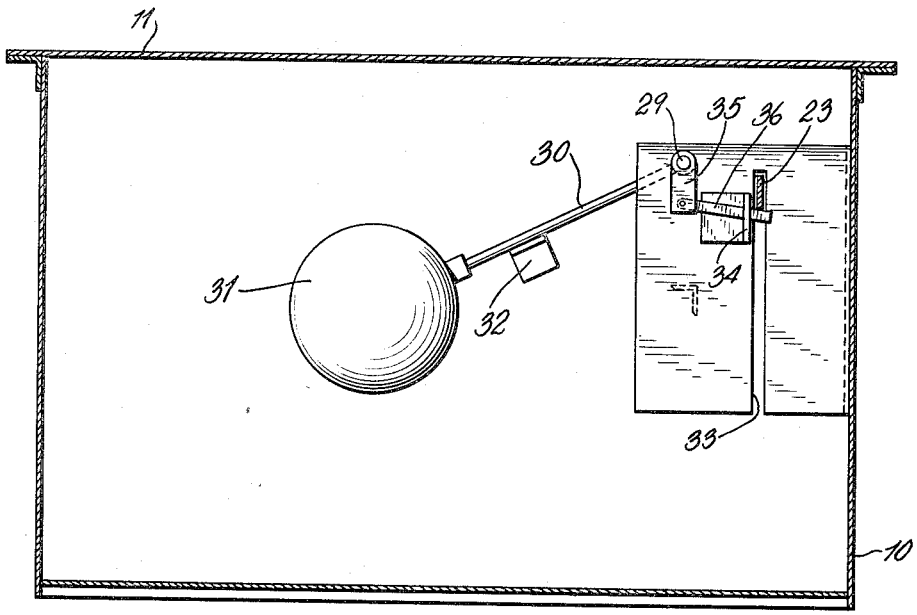
Fig. 3 is a section on the line 3—3 of Fig. 1.

A tank 10 of any desired shape is provided with a cover 11. An inlet pipe 12 leads through one wall of the tank 10 and is provided with two valves 13 and 14, the latter of which is arranged at the discharge end of the pipe and the former is arranged ahead of the latter. Flow through the valve 14 is regulated through the reciprocation of a valve stem 15 attached to one end of a lever 16 which is pivotally supported by a pin 17 mounted in a bracket 18 carried by the valve 14. A float 19 is attached to the remaining end of the lever 16 and is partially immersed in the liquid contained in the tank 10. A change of liquid level in the tank 10 causes corresponding vertical movement of the float 19 to move the valve stem 15 for regulating the flow of liquid into the tank through the faucet 14.

An outlet pipe 20 is provided for permitting the withdrawal of liquid from the tank as desired. Preferably, the pipe 20 communicates with a pump or the like (not shown) and constant liquid level is maintained in the tank 10 through the operation of the valve 14.

Flow through the valve 13 is controlled by a reciprocable valve stem 21 pivotally attached by means of the pin 22 to a lever 23 fulcrumed at 24 by the bracket 25 carried by the valve 13. On the lever 23 is provided a weight 26 which biases the lever in a direction to close the valve 13. Normally, the lever 23 is retained in valve-open position by means later to be described.

Two brackets 27 and 28 are attached to adjacent walls of the tank 10 and pivotally support a shaft 29 having a radially extending arm 30, to the end of which is attached a float 31. A stop 32 is provided for engagement by the arm 30 to limit downward movement of the float 31. The bracket 27 is provided with a slot 33 through which the lever 23 extends and also carries a bracket or lug 34. An arm 35 is fixed to the shaft 29 and its outer end is pivotally connected to a pin 36 projecting slidably through an aperture in the bracket or lug 34 into the path of the lever 23. The arrangement of the pin 36 is such that with the lever 23 shifted to the position in which the valve 12 is fully open and the arm 30 engaging the stop 32, the pin 36 engages the lower face of the lever 23 to hold it in valve-open position. Also, the arrangement is such that the float 31 is not lifted to disengage the arm 30 from the stop 32 so long as the float 19 and valve 14 co-operate to prevent the liquid level in the tank 10 rising above a predetermined maximum.

Figure 4:
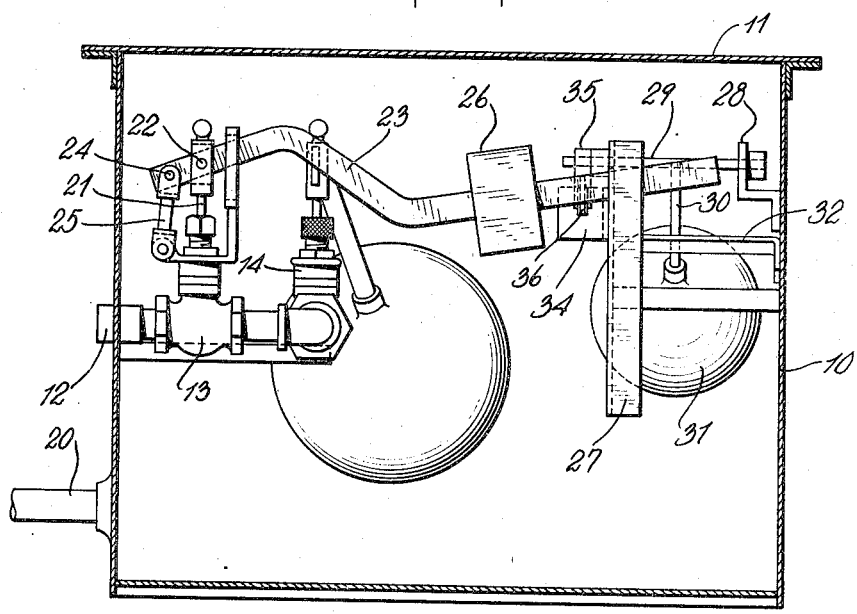
Fig. 4 is a section on the line 4—4 of Fig. 1.

In the normal operation of the device, a predetermined liquid level is maintained in the tank 10 through control of the valve 14 by the float 19. In the event of failure of the proper operation of the float 19 and valve 14 so that the liquid in the tank 10 rises above the predetermined level, the float 31 rises and rotates the shaft 29 clockwise (Fig. 3) to withdraw the pin 36 from the path of the lever 23 which is caused to move clockwise (Fig. 4) to close the valve 13 and shut off the flow of liquid to the tank 10.

I claim:

1. In a liquid reservoir having an inlet and an outlet, a plunger type valve, a weighted lever connected to the valve plunger and biasing it toward closed position, a bracket having a slot in which said lever is movable, a lug carried by said bracket, a pin slidably supported by said lug for movement into and out of the path of said lever and being adapted in one position to hold the lever in valve-open position, a float pivotally supported by said bracket, and connections between said float and said pin for effecting withdrawal of said pin from the path of said lever.

2. In a liquid reservoir having an inlet and an outlet, a plunger type safety valve, a weighted lever connected to the valve plunger and biasing it toward closed position, a bracket having a slot in which said lever is movable, a lug carried by the bracket and having an aperture, a pin slidably supported in said aperture of said lug for movement into and out of the path of said lever and being adapted when in said path to hold the lever in valve-open position, a second bracket, a shaft pivotally secured to said two brackets, a float, an arm connected to said float and secured to said shaft, and a second arm secured to said shaft and pivotally connected to said pin for effecting withdrawal of said pin from the path of said lever upon rotation of said arms and said shaft in response to elevation of the float above a determined level.

RYAN SADWITH.

REFERENCES CITED

The following references are of record in the file of this patent:

UNITED STATES PATENTS

| Number | Name | Date |
| --- | --- | --- |
| 1,557,071 | McMullen | Oct. 13, 1925 |
| 1,663,442 | Culp | Mar. 20, 1928 |
| 1,740,062 | Binkley | Dec. 17, 1929 |
| 1,762,678 | Bryan | June 10, 1930 |
| 1,770,913 | DeKermor | July 22, 1930 |
| 1,778,198 | Metcalfe | Oct. 14, 1930 |
| 1,874,858 | Beckwith | Aug. 30, 1932 |
| 1,901,456 | Kinsman | Mar. 14, 1933 |